May 19, 1925.
J. THUNBORG
CROSSCUT SAW JOINTER
Filed April 22, 1924
1,538,227
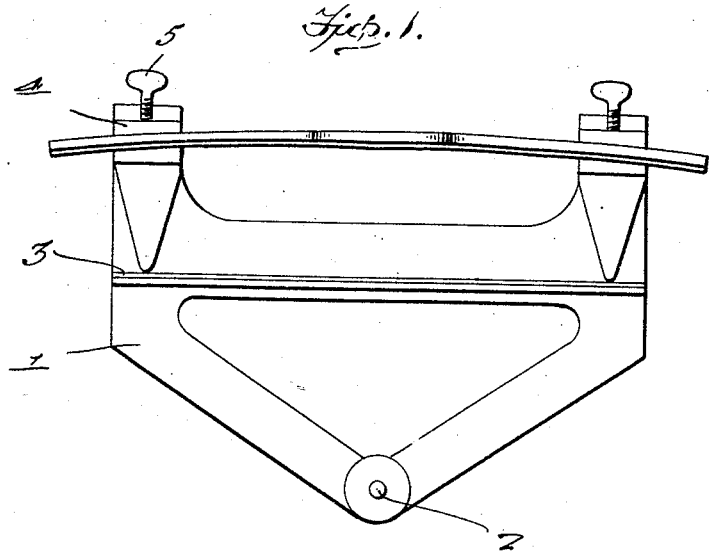
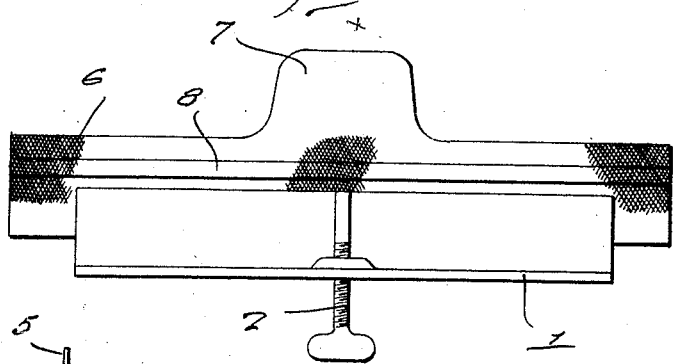
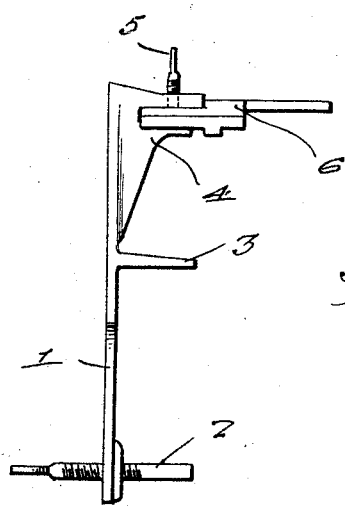
Inventor
J. Thunborg Patented May 19, 1925.

1,538,227

UNITED STATES PATENT OFFICE.

JACOB THUNBORG, OF HAYDEN LAKE, IDAHO.

CROSSCUT-SAW JOINTER.

Application filed April 22, 1924. Serial No. 708,205.

*To all whom it may concern:*

Be it known that I, JACOB THUNBORG, a citizen of the United States, residing at Hayden Lake, in the county of Kootenai and State of Idaho, have invented certain new and useful Improvements in Crosscut-Saw Jointers, of which the following is a specification.

This invention relates to cross cutting saw jointers and it consists in the novel features hereinafter described and claimed.

An object of the invention is to provide a jointer of simple structure adapted to be used for dressing the teeth of a cross cut saw after the teeth have been set whereby the exterior surfaces of the parts of the teeth are lined up parallel with the surface of the blade of the saw in order that they may cut the grain of wood precisely and clearly and without leaving ragged edges at the ends of the grain of the wood.

With the above object in view, the jointer comprises a frame having adjustable guide members adapted to bear against the side surface of the saw blade when the device is in use. The frame also includes clamping members adapted to retain a file of a special design and arrangement of its elements and features, the file being adapted to dress the corners and edges of the teeth as the frame is reciprocated along the saw blade.

In the accompanying drawing:—

Figure 1 is a side elevation of the cross cut saw jointer.

Figure 2 is an under plan view of the same.

Figure 3 is an end edge elevation of the same.

The saw jointer structure comprises a frame 1 having a guide screw 2 threaded through the lower portion thereof. The frame 1 also includes a guide flange 3 which is disposed transversely across the frame and spaced above the screw 2. The frame 1 further includes clamps 4 located at the upper corner portions of the said frame and spaced above the guide flange 3. The clamps 4 are provided with clamp screws 5. A file 6 is adapted to be inserted in the clamps 4 and secured therein by tightening the screws 5. The said file 6 is curved longitudinally to conform with the curvature of the serrated edge of a cross cut saw blade. The file 7 is provided at its outer side edge and at a point between its ends with an outstanding lug 7 which may be used for grasping the file and holding the device while in use. The file 6 is provided at its under side with a longitudinally disposed rib 8 which is spaced from the adjacent edges of the clamps 4 as best shown in Figure 3 of the drawing. The rib 8 is also curved longitudinally and is disposed between the side edges of the body of the file 6. The surfaces of the rib 8 are roughened or provided with file teeth the same as those provided upon the body of the file 6.

In use, the intermediate portion of the file 6 is grasped between the thumb and the fingers and the file is passed longitudinally along the set of teeth upon the saw blade. The corners and edges of the teeth come in contact with the edges of the rib 8 and the outer ends of the teeth come in contact with the body of the file 6. Thus the outer ends of the teeth are pressed and the side edges and corners of the teeth are dressed and lined up. As the frame is reciprocated back and forth along the saw blade, the edge of the guide flange 3 bears against the side surface of the blade and the end of the screw 2 bears against the side edge of the saw blade, and consequently the surfaces of the file are presented at proper angles to the teeth and the teeth are accurately and correctly dressed or marked.

Having described the invention, what is claimed is:

A saw jointer comprising a frame having spaced clamp members, a file adapted to be received within the clamp members and arcuately curved longitudinally, the file being provided at one side with an outstanding rib and provided at its edge with an outstanding lug adapted to serve as a handle grip.

In testimony whereof I affix my signature.

JACOB THUNBORG.